US012005407B2

(12) United States Patent
Soliman et al.

(10) Patent No.: US 12,005,407 B2
(45) Date of Patent: Jun. 11, 2024

(54) CHEMICAL INJECTION AND MIXING DEVICE

(71) Applicant: Saudi Arabian Oil Company, Dhahran (SA)

(72) Inventors: Mohamed Ahmed Soliman, Ras Tanura (SA); Samer Osamah Abduljabbar, Ras Tanura (SA); Samusideen Adewale Salu, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 213 days.

(21) Appl. No.: 17/156,061

(22) Filed: Jan. 22, 2021

(65) Prior Publication Data

US 2022/0234009 A1 Jul. 28, 2022

(51) Int. Cl.

*B01F 25/312* (2022.01)
*B01F 25/316* (2022.01)
*E21B 21/06* (2006.01)
*E21B 37/06* (2006.01)

(52) U.S. Cl.

CPC .......... *B01F 25/316* (2022.01); *B01F 25/312* (2022.01); *E21B 21/062* (2013.01); *E21B 37/06* (2013.01); *Y10T 137/87643* (2015.04)

(58) Field of Classification Search

CPC ..... Y10T 137/87643; Y10T 137/87587; B01F 25/312–312533

See application file for complete search history.

(56) References Cited

U.S. PATENT DOCUMENTS

| | | | | |
|---|---|---|---|---|
| 3,980,064 | A | 9/1976 | Ariga et al. | |
| 4,123,800 | A * | 10/1978 | Mazzei | B01F 25/4336 366/181.5 |
| 4,416,610 | A * | 11/1983 | Gallagher, Jr. | B01F 25/312 137/888 |
| 4,549,813 | A | 10/1985 | Volz et al. | |
| 5,758,691 | A | 6/1998 | Nedderman, Jr. | |
| 5,915,592 | A | 6/1999 | Mehus et al. | |
| 5,996,700 | A | 12/1999 | Sulmone | |

(Continued)

FOREIGN PATENT DOCUMENTS

| | | | |
|---|---|---|---|
| EP | 1294473 | A1 | 3/2003 |
| JP | 3148835 | U | 3/2009 |

(Continued)

OTHER PUBLICATIONS

International Search Report and Written Opinion for PCT Application No. PCT/US2022/013191 dated May 4, 2022.

*Primary Examiner* — Kevin F Murphy
(74) *Attorney, Agent, or Firm* — Bracewell LLP; Constance G. Rhebergen; Keith R. Derrington

(57) ABSTRACT

A flow of a chemical is mixed with a flow of a primary fluid to form a combined fluid, and during mixing a velocity of the combined fluid is maintained at a threshold value so that a resulting mixture of the chemical and primary fluid has a designated homogeneity. The primary fluid is directed to an end of a passage with a venturi like contour that is inside of a mixer, and the chemical is directed to a side passage that extends laterally in the mixer that intersects the passage. A spring loaded valve in the passage maintains the combined flow velocity at the threshold value.

8 Claims, 9 Drawing Sheets

(56) References Cited

U.S. PATENT DOCUMENTS

| | | | | |
|---|---|---|---|---|
| 6,030,586 | A * | 2/2000 | Kuan | C02F 1/78 4/228.1 |
| 6,187,186 | B1 * | 2/2001 | Zhadanov | E03C 1/046 137/895 |
| 6,634,376 | B2 | 10/2003 | Haas | |
| 6,926,030 | B2 | 8/2005 | Ricciardi et al. | |
| 7,137,569 | B1 | 11/2006 | Miller et al. | |
| 7,367,361 | B2 | 5/2008 | Steingass | |
| 7,520,291 | B2 | 4/2009 | Watson | |
| 7,628,016 | B2 * | 12/2009 | Vogt | F02B 37/004 137/220 |
| 9,295,953 | B2 | 3/2016 | Linga et al. | |
| 9,810,365 | B2 * | 11/2017 | Soliman | F16L 55/38 |
| 10,258,942 | B2 | 4/2019 | Kenreck et al. | |
| 10,537,861 | B2 * | 1/2020 | Cobb | B01F 35/2136 |

FOREIGN PATENT DOCUMENTS

| | | | |
|---|---|---|---|
| WO | 0200334 | A1 | 1/2002 |
| WO | 2022023802 | A1 | 2/2022 |

* cited by examiner

CHEMICAL INJECTION AND MIXING DEVICE

BACKGROUND OF THE INVENTION

1. Field of Invention

The present disclosure relates to mixing different substances by automatically combining and controlling the substances when one of their flows is at a rate adequate to result in a designated degree of dispersion, and not combining the substances when both flows are less than the rate.

2. Description of Prior Art

Fluids handling systems generally include vessels, motive devices (such as pumps and compressors), and lengths of pipe for carrying the fluids. Chemicals are sometimes injected into one or more points in the fluids handling systems, which is commonly known as chemical injection. Some reasons for chemical injection are to condition a fluid within the handling system, or remove or neutralize undesirable components in the fluid. One removal technique involves injecting a demulsifier to break an emulsion inside the fluid and facilitate removal of water from crude oil at a gas oil separation plant. The injected chemical is sometimes used to treat the pipe and includes one or more of a scale inhibitor, a corrosion inhibitor, and biocide. These fluid handling systems are sometimes found in gas oil separation plants, crude oil production platforms, crude oil transmission pipelines, chemical and/or petrochemical processing facilities, oil refineries, and well sites for oil production. Uniform and maximum mixing of the chemical into the process fluid generally increases the effectiveness of the injected chemical and reduces operating cost costs.

For many injection applications an injection quill is used to inject the chemical into the process stream, but which does not guarantee that adequate mixing occurs so that the injected chemical is effective. In some instances inadequate mixing of an injection chemical into a flow of fluid, such as crude, results in not meeting the product specifications, equipment failure, operation interruption, high chemical consumption, and consequently high operating cost equipment corrosion.

SUMMARY OF THE INVENTION

Disclosed herein is an example of a method of mixing a primary fluid with an injection chemical that includes directing the primary fluid and the injection chemical to a mixer, flowing the primary fluid and the injection chemical through the mixer to create a combined fluid in the mixer when a velocity of the combined fluid is at least a threshold magnitude so that the combined fluid forms a mixed fluid with a designated homogeneity, and blocking flow through the mixer when the velocity of the combined fluid is less than the threshold magnitude. In an example, the primary fluid is directed to an entrance of a passage that extends through the mixer and the injection chemical is directed in the mixer where sidewalls of the passage diverge away from one another. Alternatively, the injection chemical is directed in the mixer where sidewalls of the passage converge towards one another. An example of blocking flow through the mixer involves using a valve inside the mixer that is responsive to a velocity of the combined flow. In this example, blocking flow through the mixer the valve is selectively actuated into a configuration so that a portion of the valve contacts sidewalls of a passage inside the mixer and at a location where ports intersect the passage. In an alternative, flowing the primary fluid and the injection chemical through the mixer includes spacing the portion of the valve away from the sidewalls of the passage so that the injection chemical flows through the ports into the passage and the combined fluid flows along a path between the portion of the valve and the sidewalls. Alternatives of the primary fluid are a fluid such as water, oil, a process fluid, and combinations, and for the injection chemical are a substance such as a demulsifier, a scale inhibitor, a corrosion inhibitor, a biocide, and combinations. In an example, inside the mixer a flow path of the combined fluid transitions to a greater cross sectional area to increase homogeneity of the mixed fluid. The mixer is optionally equipped with multiple passages that each have an end in communication with the primary fluid and an opposite end in communication with the mixed fluid.

Also disclosed herein is a mixer that is made up of a body, a passage formed through the body, a port in a sidewall of the passage that is in communication with an injection chemical, the passage has an end in communication with a primary fluid, the primary fluid being selectively combined with the injection chemical to create a combined fluid when a velocity of the combined fluid is at least at a threshold magnitude so that the combined fluid becomes a mixed fluid having a designated homogeneity. The mixer of this embodiment also includes a valve in the passage that is selectively moveable to a blocking configuration when the velocity is below the threshold level and defines a barrier to flow of the combined fluid through the passage, and when the velocity is at least at the threshold magnitude the valve is moveable to a flowing configuration and that permits a flow of the combined fluid through the passage. The valve is optionally fixed within the passage and comprises a base, a spring, and a disk. In an alternative, the valve includes a valve disk having a lateral surface that extends along a path that is oblique to an axis of the passage, and wherein sidewalls of the passage are oblique to the axis. In an embodiment, the disk is biased from the base by the spring and into the blocking configuration when the velocity is below the threshold level. The spring is alternatively compressed when a spring force of the spring is exceeded by a force exerted onto the disk from the flow of the combined fluid when the velocity is at least at the threshold magnitude. In an example, when the spring is compressed the disk is moved adjacent to the base, and wherein an area of a rearward surface of the disk exceeds an area of a front surface of the base, so that when the disk is a discontinuity is formed along an interface between the disk and base that increases mixing of the primary fluid and injected chemical. In an embodiment, sidewalls of the passage converge towards one another along a converging portion of the passage and diverge away from one another along a diverging portion of the passage, and wherein a throat is defined in the passage between the converging and diverging portions. The port is optionally located upstream or downstream of the throat. In an example, a plurality of ports are disposed around a circumference of the passage.

BRIEF DESCRIPTION OF DRAWINGS

Some of the features and benefits of the present invention having been stated, others will become apparent as the description proceeds when taken in conjunction with the accompanying drawings, in which.

Figure 1:
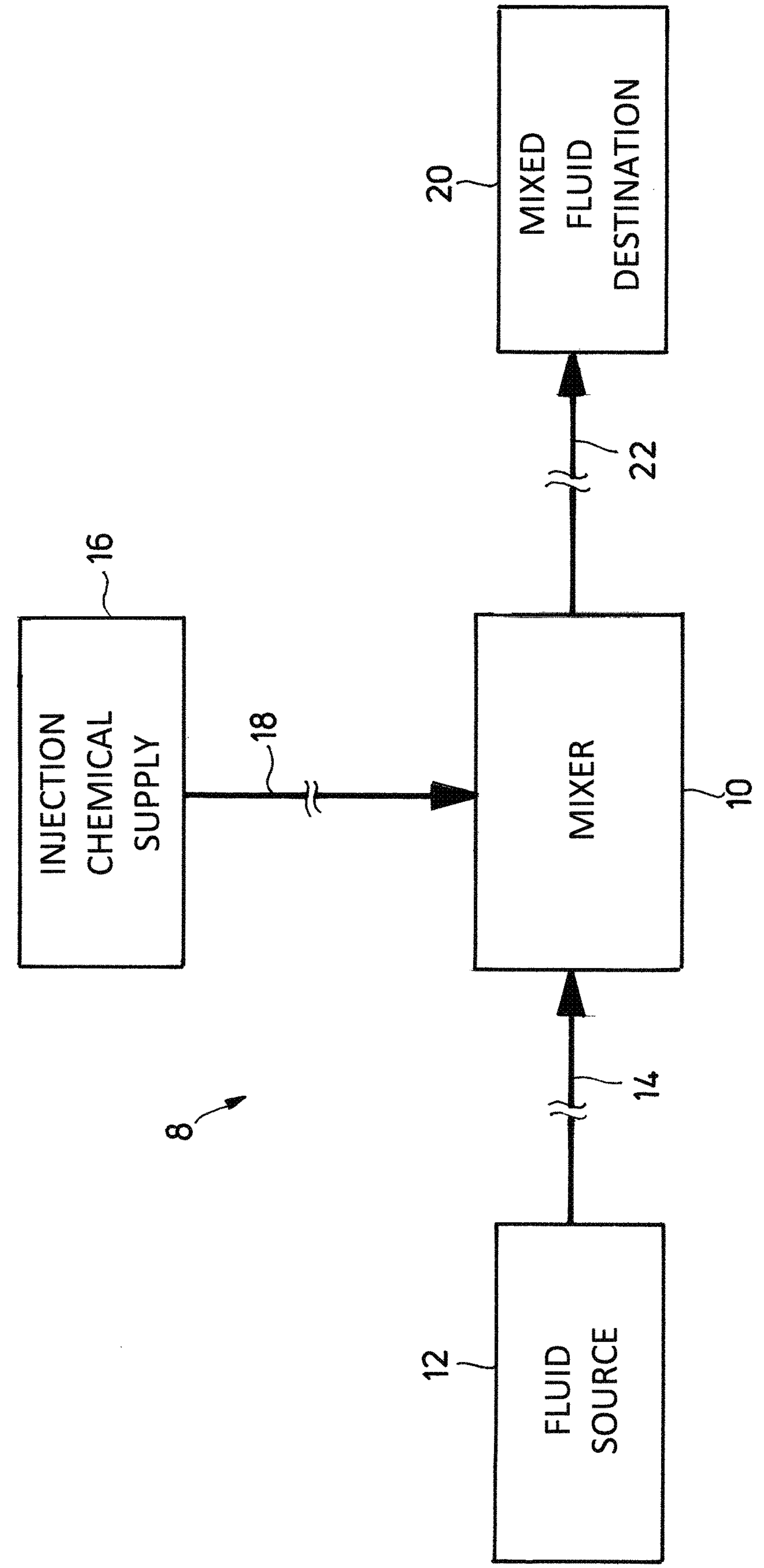
FIG. 1 is a schematic example of a fluids handling circuit having a mixer.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown schematically in FIG. 1 is an example of a fluids handling circuit 8 that includes a mixer 10 shown in communication with a fluid source 12 via line 14, and in communication with an injection chemical supply 16 via line 18. A discharge or exit of mixer 10 is in communication with a mixed fluid destination 20 via line 22. In an example, the fluid handling circuit 8 is part of a larger installation in which fluids (or substances in other states) are handled or processed, non-limiting examples include a refinery, a chemical processing plant, a water purification system, an oil field production system, and the like. Examples of the fluid source 12 include water, oil, a process fluid, and combinations. Examples of the injection chemical supplies 16 include a system that supplies a demulsifier, a scale inhibitor, a corrosion inhibitor, a biocide, and combinations. In a non-limiting example, mixer 10, a fluid from fluids source 12 and an injection chemical from an injection chemical supply 16 are combined and then mixed so that the fluid and the injection chemical are dispersed within one another to a degree of that is at least at a designated homogeneity. An example of a designated homogeneity is that when examining or analyzing a portion of the mixed fluid, a dispersion of the fluid and injection chemical within that sample are substantially uniform, and so that the portion is substantially homogeneous. In this example, the quantity or size of the sample is optionally variable, so that an analysis of different amounts or volumes of the combination of the fluid and injection chemical yield a different degree of homogeneity. In a non-limiting example, an analysis of a smaller quantity or sample of mixed fluid yields a lower degree of homogeneity than an analysis of a larger amount quantity of the same mixed fluid.

Figure 2:
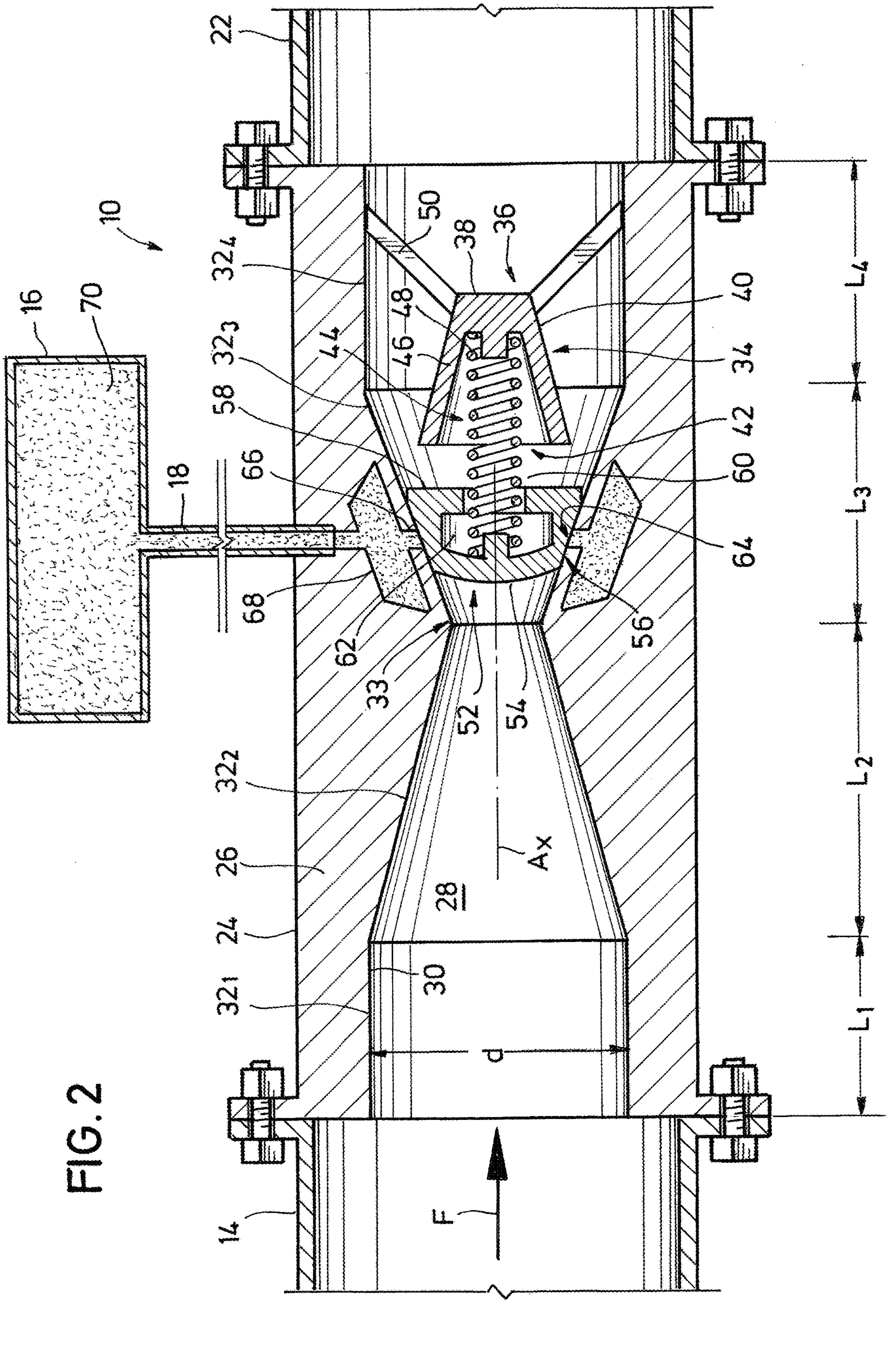
FIG. 2 is a side sectional view of an example of the mixer of FIG. 1 in a non-flowing state.

Shown in FIG. 2 is a side sectional view of an embodiment of mixer 10 between line 14 and line 22 and coupled to lines 14, 22 with flanged connections. Mixer 10 of FIG. 2 includes an outer housing 24 shown as a generally tubular member. Inside housing 24 is a generally solid body 26 intersected by a passage 28 shown extending along an axis $A_X$ of mixer 10. In the example shown, passage 28 provides fluid commination between line 14 and line 22. Sidewalls 30 of passage 28 are profiled and shown substantially paralleled with axis $A_X$ along a first Section $\mathbf{32}_1$ of passage 28. Along a second section $\mathbf{32}_2$ sidewalls 30 converge towards one another and downstream of second section $\mathbf{32}_2$ is a third section $\mathbf{32}_3$ in which the sidewalls 30 diverge away from one another. A throat 33 is defined along an interface of the second and third sections $\mathbf{32}_2$, $\mathbf{32}_3$, the cross sectional area within passage 28 is at a minimum value at throat 33. A fourth section 324 of passage 28 extends between third section $\mathbf{32}_3$ and exit of passage 28. For purposes of illustration, the first section $\mathbf{32}_1$ has a length shown as $L_1$, the second section $\mathbf{32}_2$ has a length shown as $L_2$, the third section $\mathbf{32}_3$ length $L_3$ and the forth section 324 has a length $L_4$. In this example $L_2$ is greater than $L_3$ and $L_4$ is greater than $L_1$, additional embodiments exist in which the lengths $L_{1-4}$ are not limited to the illustrations shown and each have magnitudes different from those shown. Further shown is that the diameter D of passage 28 is substantially constant in first section $\mathbf{32}_1$ and also in fourth section 324 that varies along the axis $A_X$ within the second and third sections $\mathbf{32}_2$, $\mathbf{32}_3$.

The mixer 10 of FIG. 2 includes a valve assembly 34 shown within second and third sections 322, 323 of passage 28. Included with valve assembly 34 is a valve base 36 shown having a frusto-conical shape with a back surface 38 that is substantially perpendicular with axis $A_X$ and on a side of valve base 36 proximate line 22. A side surface 40 of valve base 36 is on its outer radial portion and which tapers radially inward with distance from its front surface 42 towards its back surface 38. Front surface 42 of valve base 36 is on an end of valve base 36 opposite from back surface 38 and is intersected by an opening 44 that is formed within the valve base 36 and also has a frusto-conical configuration. Shown radially disposed between opening 44 and the side surface 40 are walls 46, which similar to side surface 40 are oblique to axis $A_X$. A spring 48 which is shown as coil spring, has an end inserted into opening 44. In the configuration of FIG. 2 spring 48 is in an uncompressed state. Elongated struts 50 project obliquely from side surface 40 and attach to the sidewall 30, and that provide an example manner of securing valve base 36 within passage 28.

Still referring to FIG. 2, also included with the valve assembly 30 is a valve disk 52 shown coupled to an end of spring 48 opposite from valve base 36. Valve disk 52 includes a forward surface 54 on a side facing away from valve base 36, and a lateral surface 56 that extends obliquely away from forward surface 54 and towards valve disk 36. In the example of FIG. 2, the contour of the lateral surface 56 is substantially the same as the contour of the sidewall 30 in the third section $\mathbf{32}_3$ of passage 28. In this example, the sidewalls 30 in this section $\mathbf{32}_3$ and the lateral surface 56 are each oriented oblique to axis $A_X$. A rearward surface 58 of the valve disk 52 is shown spaced away from and facing the valve base 36 and having an opening 60 formed through the rearward surface 58. A chamber 62 is formed within the valve disk 52, an end of spring 48 opposite from valve disk 36 projects through opening 60 and into the chamber 62. Valve assembly 34 of FIG. 2 is shown in a blocking configuration, and which is a barrier to a flow of fluid F from line 14 through passage 28. Also in the blocking configuration valve disk 52 is adjacent ports 64 show intersecting side wall 30. Leads 66 are shown extending from ports 64 through body 26 into a plenum 68, which in the example shown is formed in body 26 and circumscribes at least a portion of passage 28. Line 18, plenum 68, lead 66 and port 64 provide a communication path between injection chemical supply 16 and passage 28, and for the introduction of injection chemical 70 from injection chemical supply 16 into passage 28 for being combined with fluid F. Embodiments exist in which fluid F is one or more of a primary fluid, a dispersed fluid, a solvent, and a solute and injection chemical 70 is respectively one or more of a dispersed fluid, a primary fluid, a solute, and a solvent. In addition to preventing flow of additional fluid F into passage 28, the valve assembly 34 when in the blocking configuration provides a barrier to flow of injection chemical 70 into passage 28.

In one embodiment of FIG. 2, the valve assembly 34 automatically is configured into the blocking configuration at a time when the flow of the fluid F or the primary fluid is such that when combined with the injection chemical 70 the resulting combination undergoes an amount of mixing that is below a designated amount of homogeneity. Not to be bound by theory, but homogeneity of the combination of the injection chemical and fluid is dependent at least in part on the velocity of the fluid F being directed into passage 28. At lesser flowrates of the fluid F and/or injection chemical 70, which necessarily result in a lower velocity of fluid F and/or injection chemical 70 flowing inside mixer 10 so that the resulting perturbations generated in the combined flow due to kinematic effects are insufficient to produce the level of mixing required to achieve the designated level of homogeneity. It is believed it is within the capabilities of one skilled to determine a threshold of velocity of the fluid F and/or injection chemical 70 within the mixer 10 required to achieve the designated level of homogeneity.

Figure 3:
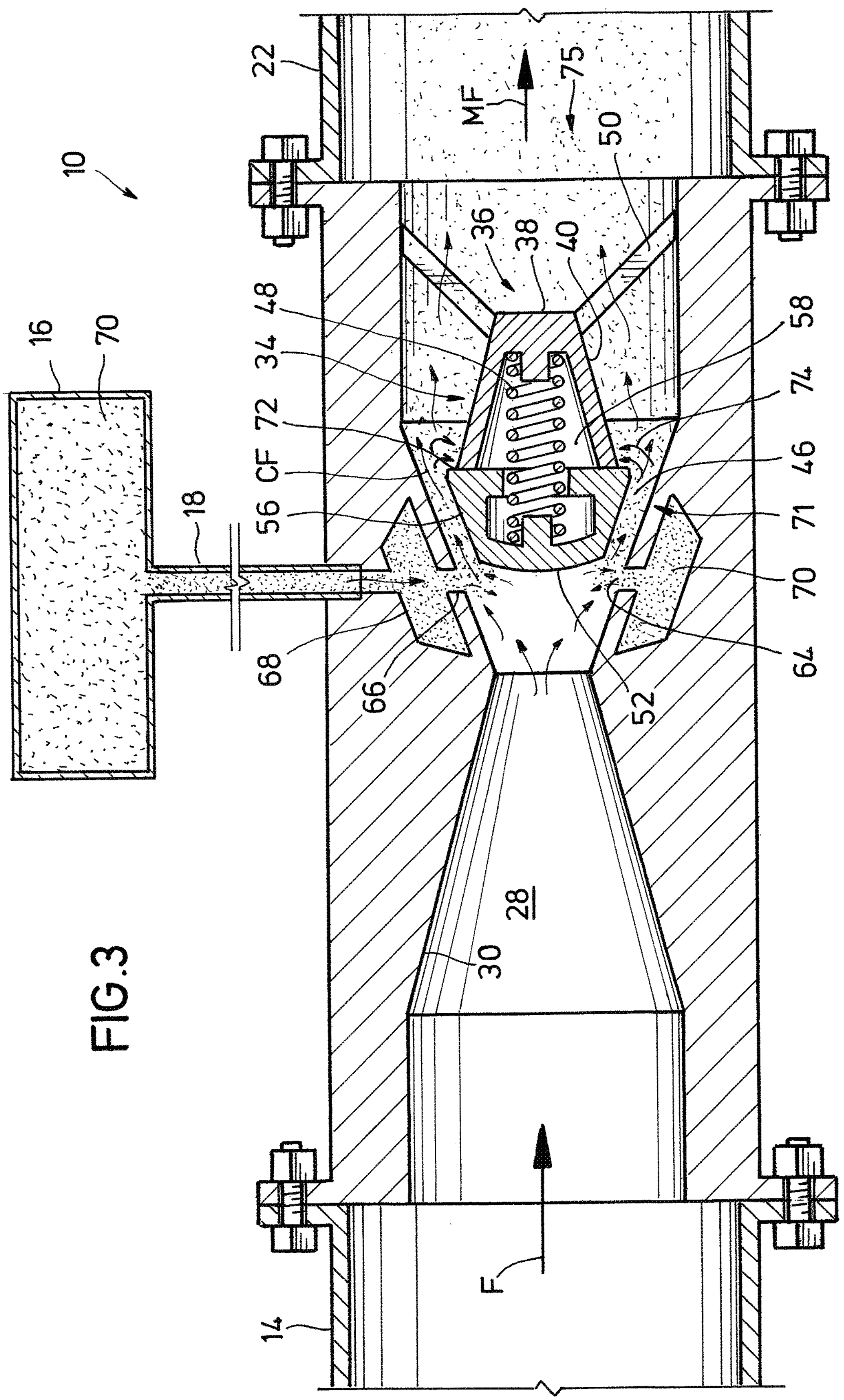
FIG. 3 is a side sectional view of an example of the mixer of FIG. 2 in a flowing state.

In a non-limiting example of use, valve assembly 34 automatically reconfigures from the blocking configuration of FIG. 2 into a flowing configuration as shown in the side sectional view of FIG. 3. In this example of a flowing configuration of the valve assembly 34, the valve disk 52 has been biased axially within passage 28 and moved adjacent valve base 38 so that a combined flow CF of the fluid F and injection chemical 70 flows in an annular space 71 between the sidewalls 30 and the lateral surface 56 of valve disk 52. In the example of FIG. 3, the velocity and or pressure of the fluid F being introduced into passage 28 at a level so that the conditions of the combined flow CF result into a mixed flow MF (schematically illustrated within line 22 and downstream of passage 28), where the mixed flow MF has at least the designated degree of homogeneity. Characteristics of the combined flow CF for producing the sufficiently mixed (e.g. the designated level of homogeneity) include velocity, pressure, and resulting Reynolds number (Re) of the combined flow. Further shown in FIG. 3 is that the diameter of the valve disk 52 along its rearward surface 58 is greater than the diameter of the front surface 42 of the valve base 36. The difference in diameter of these surfaces 56, 42 results in a discontinuity 72 with a downstream facing ledge at the outer periphery of the rearward surface 58. In the example shown, eddy currents 74 are generated downstream of the discontinuity 72 and that redirect a portion of the combined flow CF radially inward. Redirecting the direction of the combined flow CF increases interaction between the fluid F and injection chemical 70 to further promote mixing between the fluid F and injection chemical 70, and which increases the degree of homogeneity in the combined fluid CF and to ensure the mixed fluid MF achieves the designated degree of homogeneity.

Further illustrated in FIG. 3 is an example of a packet 75 of the injection chemical 70 dispersed within the fluid F. Embodiments exist in which the packet 75 has a diameter ranging from a micron or smaller scale to a millimeter or more. The diameter of the packet 75 is optionally adjusted by varying the spring constant of spring 48 and to alter perturbations in the flow of combined fluid CF. Yet further optionally, different dimensions of packet 75 are obtained by altering the shape and/or dimensions of valve disk 52. In the example of FIG. 3, the mixed fluid MF is shown flowing into line 22 and towards its mixed fluid destination 20 and where the advantages of treating the fluid F with the injection chemical 70 to create the mixed fluid F are realized; such by reducing scale, reducing corrosion, emulsifying constituents within the fluid F and preventing emulsions flowing within a line, as well as other benefits that are realized with that injection chemical.

Figure 4:
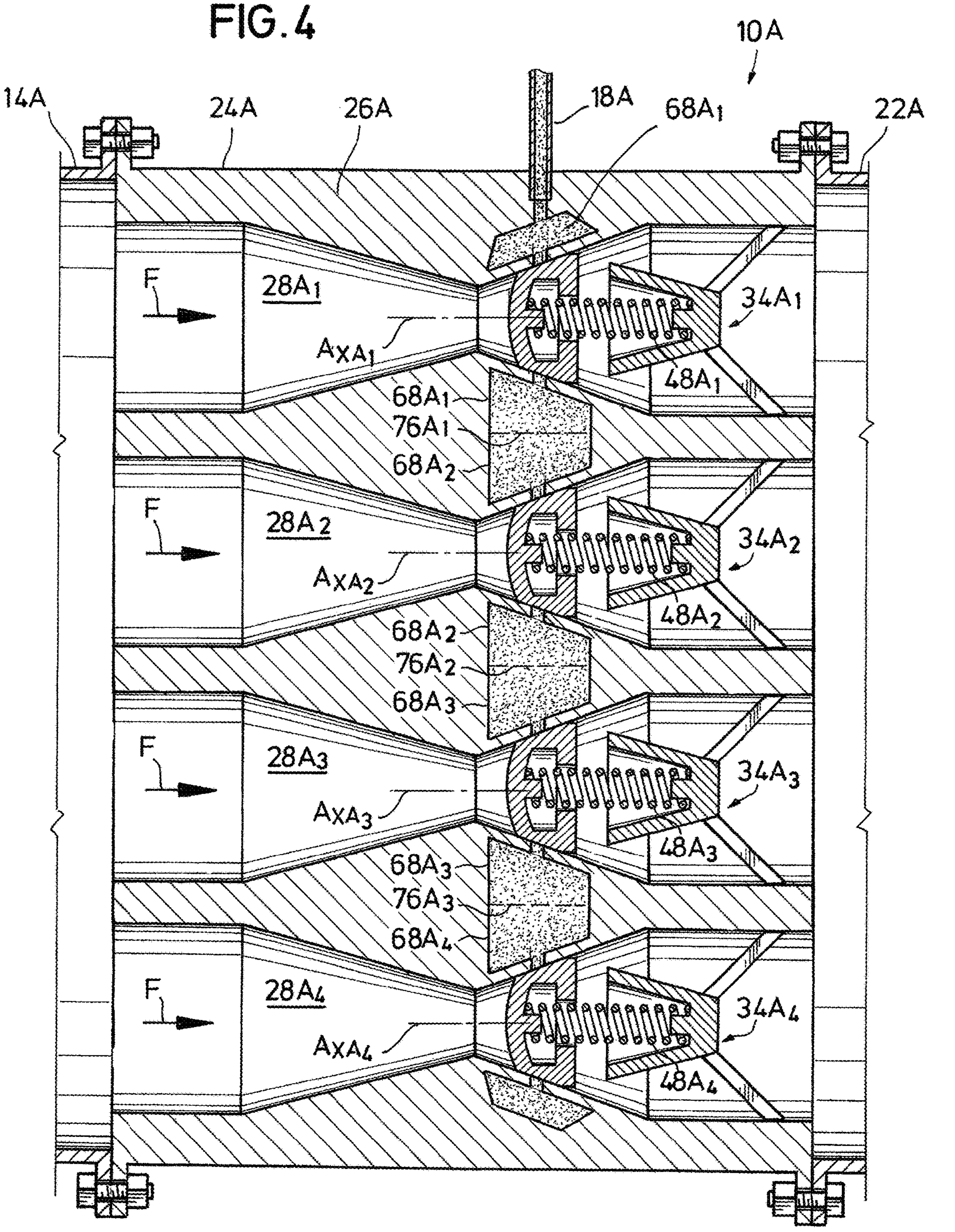
FIG. 4 is a side sectional view of an alternate example of the mixer of FIG. 1 in a non-flowing state.
Figure 5:
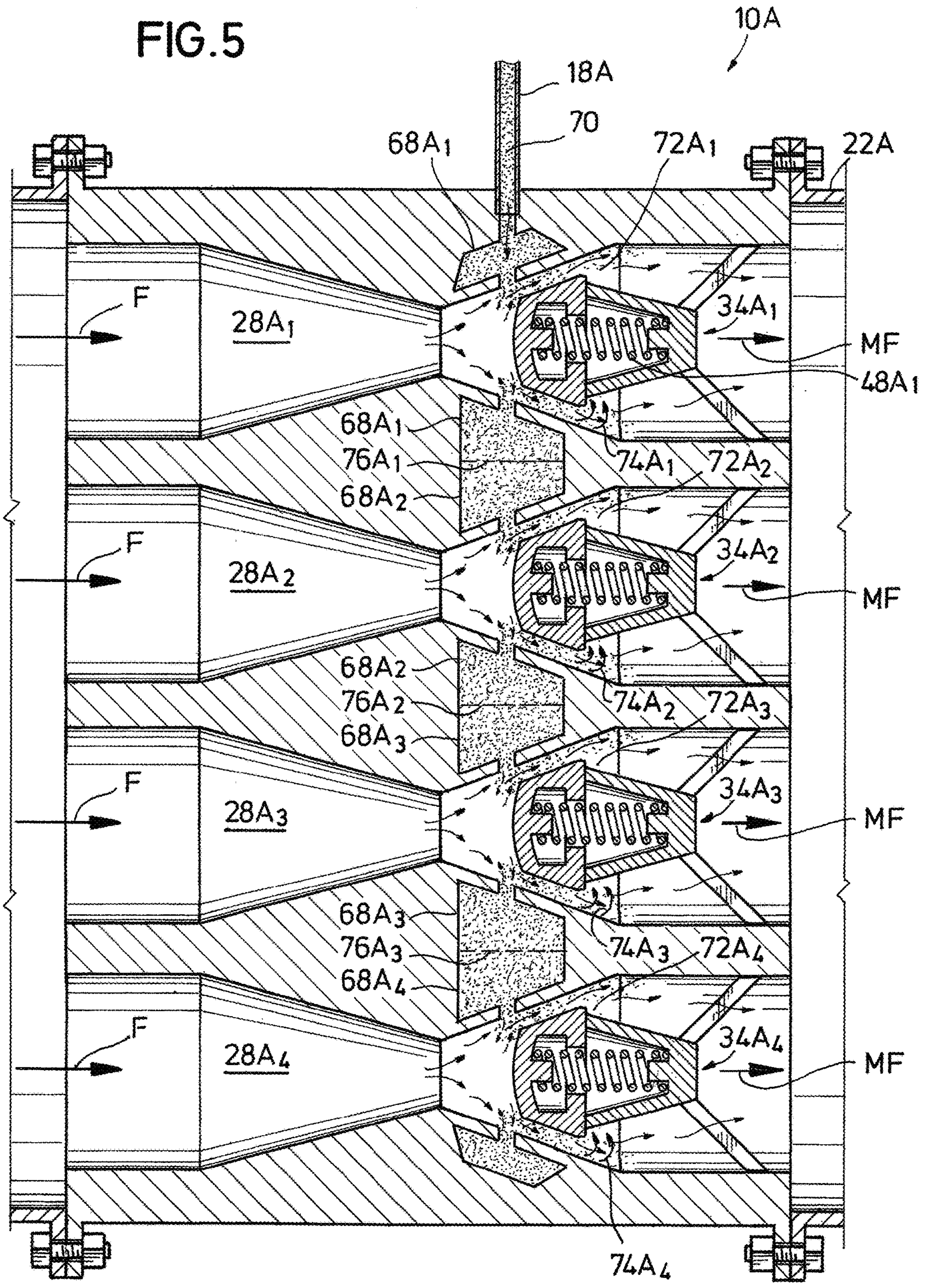
FIG. 5 is a side sectional view of an example of the mixer of FIG. 4 in a flowing state.

In FIGS. 4 and 5 in side sectional views are an alternate example of a mixer 10A with multiple passages $\mathbf{28}\text{A}_{1\text{-}4}$ formed at spaced apart locations within a housing 24A and through a body 26A of mixer 10A. In each of the passages $\mathbf{28}\text{A}_{1\text{-}4}$ are valve assemblies $\mathbf{34}\text{A}_{1\text{-}4}$ similar in construction and operation to the valve assembly 34 of FIGS. 2 and 3. Also in the embodiment of FIGS. 4 and 5 are plenums $\mathbf{68}\text{A}_{1\text{-}4}$ circumscribing each of the passages $\mathbf{28}\text{A}_{1\text{-}4}$. Between adjacent passages $\mathbf{28}\text{A}_{1\text{-}4}$ the plenums $\mathbf{68}\text{A}_{1\text{-}4}$ are separated by boundaries $\mathbf{76}\text{A}_{1\text{-}3}$. The boundaries $\mathbf{76}\text{A}_{1\text{-}3}$ are not barriers between different plenums $\mathbf{68}\text{A}_{1\text{-}4}$ but illustrate that injection chemical 70A is shared between these adjacent plenum $\mathbf{68}\text{A}_{1\text{-}4}$. In the example of FIG. 5 fluid F is shown entering the passages $\mathbf{28}\text{A}_{1\text{-}4}$ and having a designated velocity and/or pressure to cause springs $\mathbf{48}\text{A}_{1\text{-}4}$ within each of the valve assembly $\mathbf{34}\text{A}_{1\text{-}4}$ to automatically change into flowing configurations and allow mixing of the injected chemical 70 with the fluid F and produce a mixed fluid MF shown entering line 22A. Examples exist where springs $\mathbf{48}\text{A}_{1\text{-}4}$ have different spring constants so that some open at pressures or velocities of fluid F while others remain closed so that fluid not flowing to each of the passages $\mathbf{28}\text{A}_{1\text{-}4}$ at each variations of conditions of the fluid F.

Figure 6:
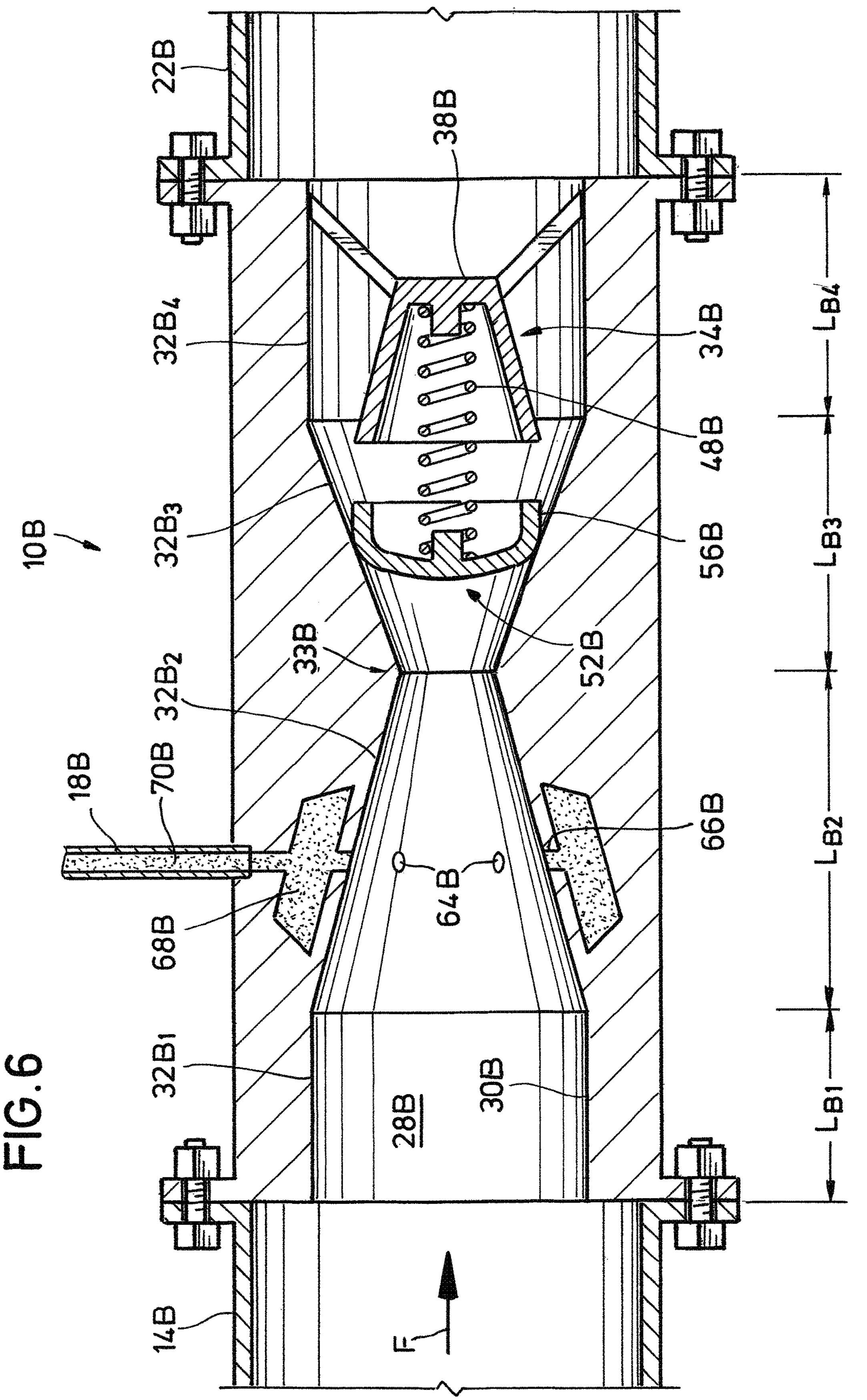
FIG. 6 is a side sectional view of an alternate example of the mixer of FIG. 1 in a non-flowing state.
Figure 7:
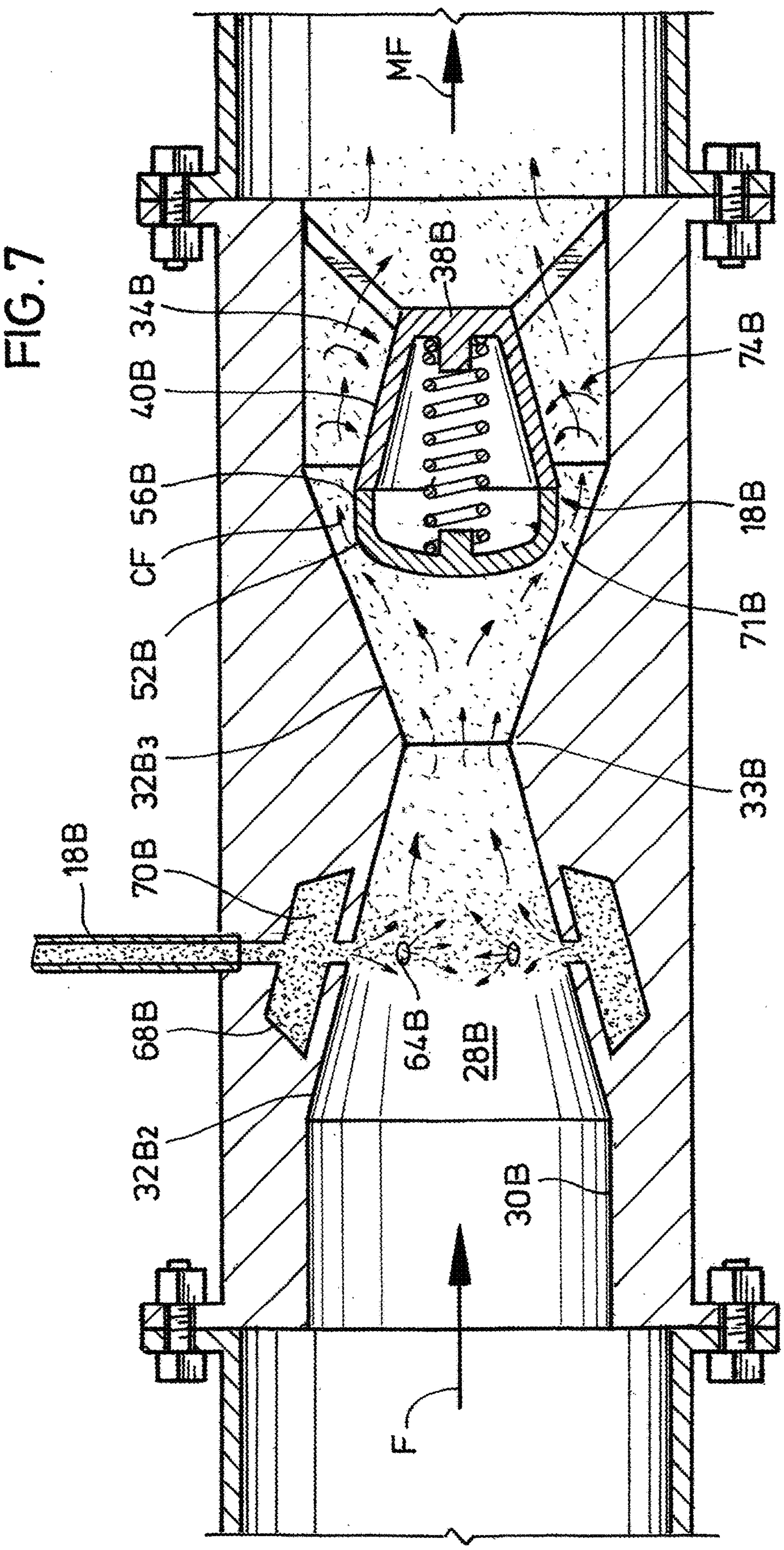
FIG. 7 is a side sectional view of an example of the mixer of FIG. 6 in a flowing state.

Another alternate example of mixer 10B is shown in FIGS. 6 and 7. As shown, mixer 10B is equipped with a single passage 28B and made up of sections $\mathbf{32}\text{B}_{1\text{-}4}$ with configurations similar to the sections $\mathbf{32}_{1\text{-}4}$ of FIGS. 2 and 3. Also similar is the valve assembly 34B and which has shown in a blocking configuration and that operates as a barrier to flow through passage 28B. In the example of FIGS. 6 and 7 sections $\mathbf{32}\text{B}_{1\text{-}4}$ have lengths $\text{LB}_{1\text{-}4}$ respectively. Ports 64B are provided for communicating injection chemicals 70B into the passage 28B, in example shown ports 64B project through sidewalls 30B and in the second section $32B_2$ to an upstream of throat 33B. The blocking configuration of the valve assembly 34B blocks fluid flow through passage 28B and prohibits injection of fluid F into passage 28B as well as the injection chemical 70 through the ports 64B. In an alternative, a check valve or valves (not shown) are provided within leads 66B or alternatively within line 18B. The check valves prevent backflow of fluid F into the plenum 68B or line 18B. Similar to the example of FIGS. 2 and 3, the fluid F is at a pressure and or velocity that is below the value or threshold for sufficiently mixing the injection chemical 70 and fluid F for achieving a designated level of homogeneity in a mixed fluid or combined fluid downstream of mixture 10B. Referring now to FIG. 7, the valve assembly 34B has automatically (due to compression of the spring 48B) reconfigured into a flowing configuration and that allows the flow of the injection chemical 70B into the passage 28B via port 64B; and the increased velocity across the annular space 71B produces the mixed flow MF due to the valve assembly 34B opening when the flow of the fluid F is sufficient to achieve the designated level of homogeneity. In the example of FIG. 7, it is noted that the dimensions of the rearward surface 58B and front surface 42B are generally similar and so that a continuous surface 78B is formed along the interface between the lateral surface 56B and side surface 40B. Unlike the configuration of FIGS. 2 and 3 that include a discontinuity 72, in the configuration of FIGS. 6 and 7 the valve base 38B and the frusto-conical shape increase the cross sectional area inside the passage 28B downstream of the continuous surface 78B. The increased cross sectional are generates eddy currents 74B that as described above promote mixing of the combined fluid CF so that a mixed fluid MF is formed having a level of mixing that is at least that of a designated level of homogeneity.

Figure 8:
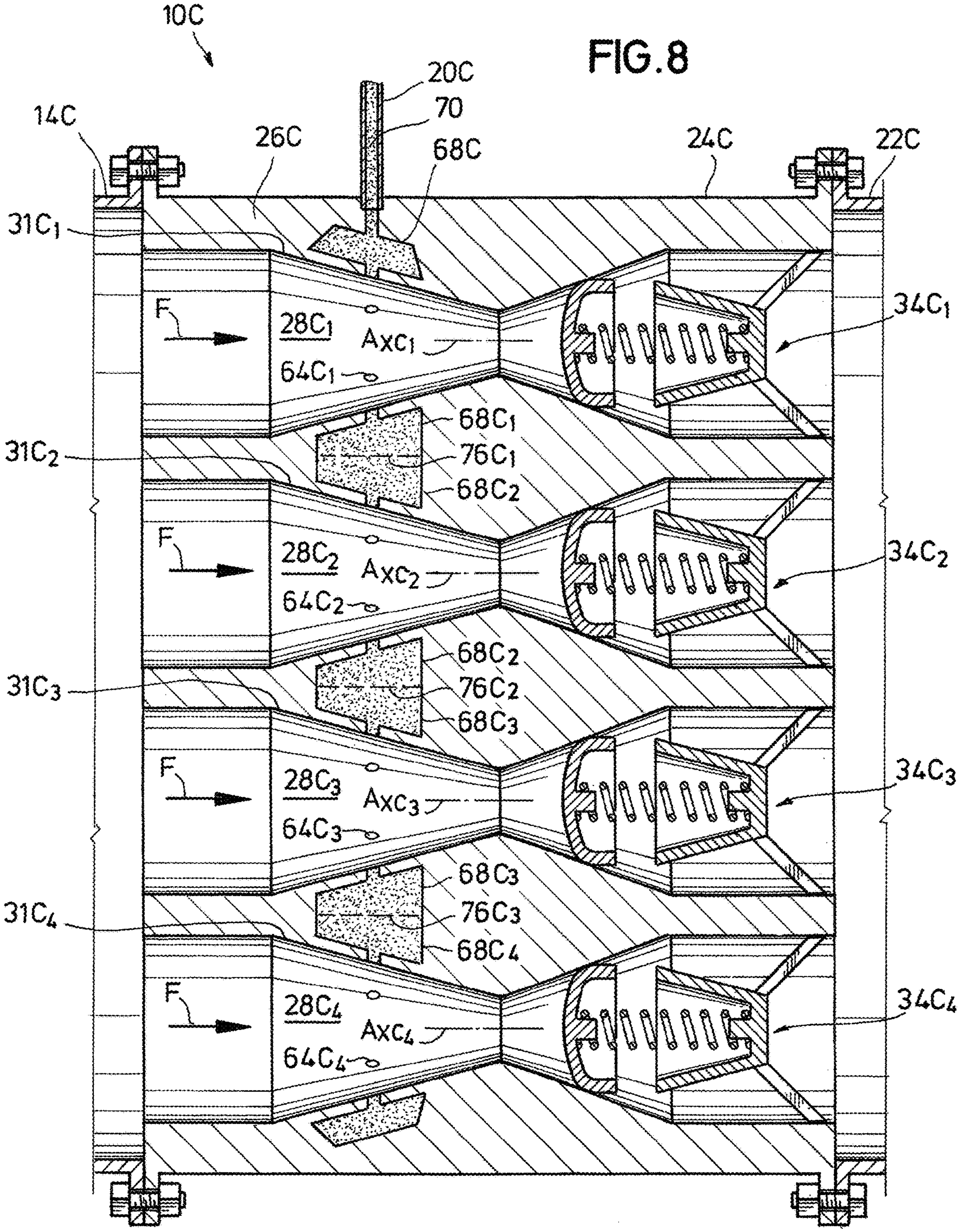
FIG. 8 is a side sectional view of an alternate example of the mixer of FIG. 1 in a non-flowing state.
Figure 9:
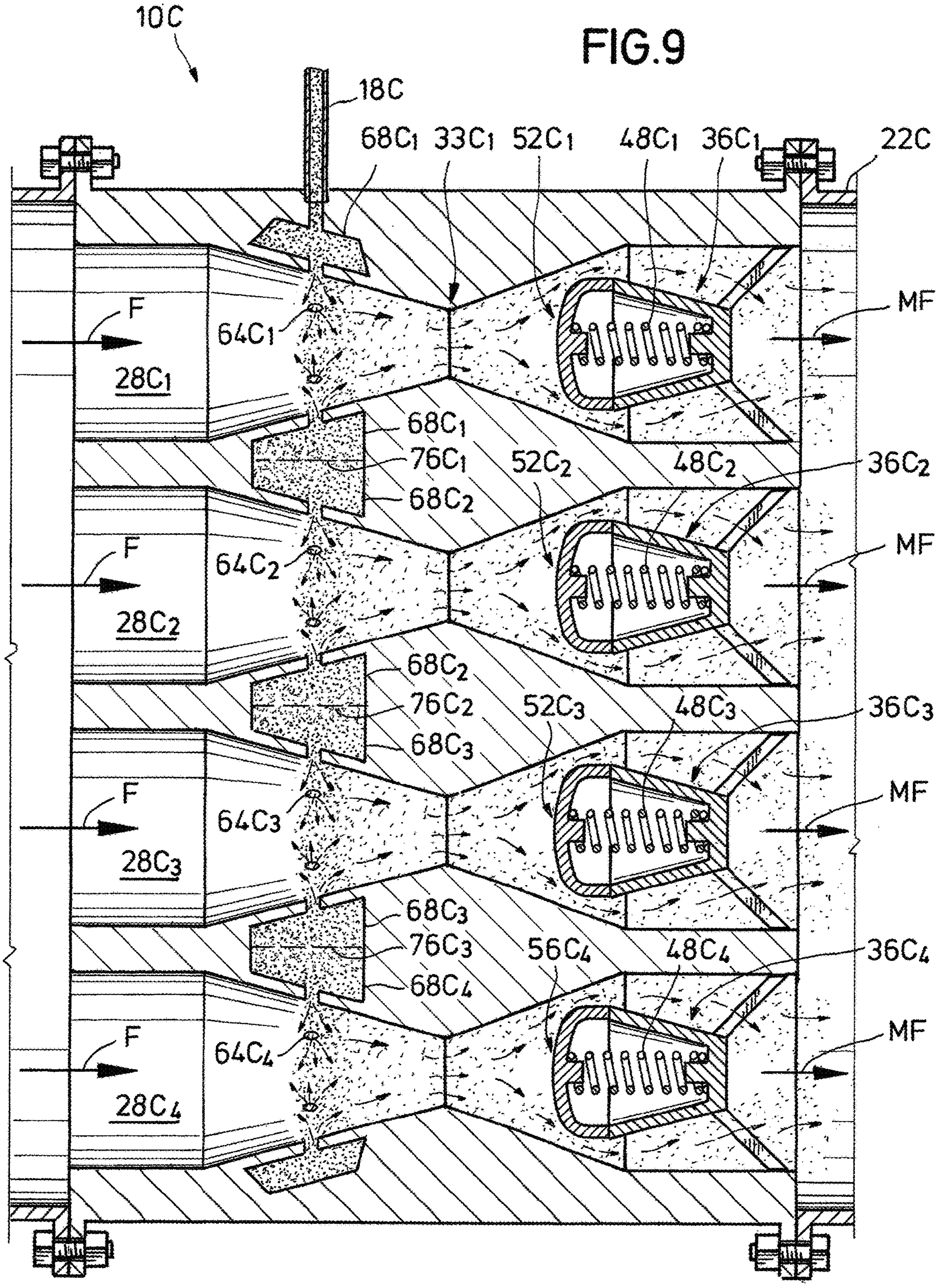
FIG. 9 is a side sectional view of an example of the mixer of FIG. 8 in a flowing state.

Shown in side sectional view in FIGS. 8 and 9 is another alternate example of a mixer 10C having an outer housing 24C and multiple passages $28C_{1-4}$ axially through the body 26C. In this example valve assemblies $24C_{1-4}$ are provided within the passages $28C_{1-4}$ and where the valve assemblies $34C_{1-4}$ are similar to the valve assembly 34B of FIGS. 6 and 7. Additionally, injection chemical 70 is introduced into the passage is $28C_{1-4}$ at ports $64C_{1-4}$ that are within the second section $32C_2$ of the respective passages $28C_{1-4}$; and similar to the configuration of FIGS. 4 and 5, plenums $68C_{1-4}$ circumscribe passages $28C_{1-4}$ and adjacent plenums $68C_{1-4}$ interface along boundaries $76C_{1-3}$, but the injection chemical $70C_{1-3}$ is flowable across the boundaries $76C_{1-3}$. As depicted in FIG. 9, the valve assemblies $34C_{1-4}$ are in a flowing configuration and which provides for a flow of the injection chemical 70 and fluid F through the passages $28C_{1-4}$ to produce a mixed fluid MF exiting the passages $28C_{1-4}$ and into the line 22C downstream of the mixer 10C. Alternatively, springs $48C_{1-4}$ within the valve assemblies $34C_{1-4}$ are changeable between the blocking and flowing configurations at different values of velocity or pressure within the passages $28C_{1-4}$.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A mixer comprising:

a body;

a passage formed through the body;

an annular plenum circumscribing the passage and having an inner radius that is parallel with a sidewall of the passage and a frusto-conical cross section, the plenum in communication with a source of an injection chemical;

a port in the sidewall of the passage that is in communication with the plenum;

the passage having an end with an opening that is in communication with a primary fluid, the primary fluid being selectively combined with the injection chemical to create a combined fluid when a velocity of the primary fluid is at a threshold magnitude so that the combined fluid is mixed inside the mixer and becomes a mixed fluid having a designated homogeneity; and a valve assembly in the passage that is moveable to a blocking configuration when the velocity is below the threshold magnitude and defines a barrier to flow of the primary fluid and injection chemical into the passage, and when the velocity is at least at the threshold magnitude the valve assembly being moveable to a flowing configuration and that permits a flow of the primary fluid and injection chemical into the passage.

2. The mixer of claim 1, wherein the valve assembly comprises a frusto-conical valve base, a spring, and a valve disk disposed upstream of the valve base, and wherein the plenum is formed in the body and has an outer radius that is parallel with the sidewall of the passage.

3. The mixer of claim 2, wherein the valve disk is profiled complementary to oblique sidewalls of the passage, wherein when the velocity is below the threshold magnitude, the spring is configured to bias the valve disk away from valve base and against sidewalls of the passage adjacent the port and forms a barrier to a flow of primary fluid through the passage and a barrier of flow of injection chemical into the passage, and wherein when the velocity is above the threshold magnitude, the valve disk is moved by the primary fluid towards the valve base and the primary fluid and injection chemical flow around the valve disk in an annular space between the valve disk and sidewalls of the passage.

4. The mixer of claim 2, further comprising elongated struts each having an upstream end connected to a portion of the valve base distal from the valve disk and a downstream end connected to the sidewall of the passage at a location downstream of the valve base, and wherein the disk is biased from the base by the spring and into the blocking configuration when the velocity is below the threshold magnitude.

5. The mixer of claim 2, wherein the spring is compressed when a spring force of the spring is exceeded by a force exerted onto the disk from the flow of the primary fluid when the velocity is at least at the threshold magnitude.

6. The mixer of claim 1, wherein sidewalls of the passage converge towards one another along a converging portion of the passage and diverge away from one another along a diverging portion of the passage, and wherein a throat is defined in the passage between the converging and diverging portions.

7. The mixer of claim 6, wherein the port is located downstream of the throat, and wherein communication between the plenum and the passage is through a lead line having an end connected to a midportion of the plenum and an opposite end connected to the port.

8. The mixer of claim 1, further comprising a plurality of ports disposed around a circumference of the passage.

* * * * *